US007811639B2

(12) United States Patent
Bär

(10) Patent No.: US 7,811,639 B2

(45) Date of Patent: Oct. 12, 2010

(54) APPARATUS AND PROCESS FOR PAINT OR LACQUER COATING OF A METAL SHEET CAPABLE OF COILING

(75) Inventor: Kai K. O. Bär, Bad Aibling (DE)

(73) Assignee: Advanced Photonics Technologies AG, Bruckmuhl (DE)

( * ) Notice: Subject to any disclaimer, the term of this patent is extended or adjusted under 35 U.S.C. 154(b) by 201 days.

(21) Appl. No.: 11/916,708

(22) PCT Filed: Jun. 6, 2006

(86) PCT No.: PCT/EP2006/005387

§ 371 (c)(1), (2), (4) Date: Dec. 6, 2007

(87) PCT Pub. No.: WO2006/131315

PCT Pub. Date: Dec. 14, 2006

(65) Prior Publication Data

US 2008/0220180 A1 Sep. 11, 2008

(30) Foreign Application Priority Data

Jun. 6, 2005 (DE) ........................ 10 2005 025 945
Jan. 31, 2006 (DE) ........................ 10 2006 004 574

(51) Int. Cl.
*B29C 71/02* (2006.01)

(52) U.S. Cl. ........................ 427/542; 427/375; 427/388; 427/541; 428/615; 428/635; 428/156; 428/336

(58) Field of Classification Search ................. 427/542, 427/375, 376, 384, 388.1; 428/615, 635, 428/336, 156
See application file for complete search history.

(56) References Cited

U.S. PATENT DOCUMENTS

| | | | | |
|---|---|---|---|---|
| 2,777,964 | A | 1/1957 | DiMino | |
| 5,041,312 | A * | 8/1991 | Swartz | 427/378 |
| 5,736,086 | A | 4/1998 | Jones et al. | |
| 5,989,645 | A * | 11/1999 | Flores | 427/433 |
| 6,421,503 | B2 * | 7/2002 | Grob et al. | 392/407 |
| 6,562,407 | B1 * | 5/2003 | Bonnebat et al. | 427/375 |
| 6,569,510 | B1 * | 5/2003 | Menon et al. | 428/156 |
| 6,647,640 | B2 * | 11/2003 | Greive | 34/275 |
| 2004/0013814 | A1 | 1/2004 | Guerfi et al. | |
| 2005/0031894 | A1 * | 2/2005 | Klos et al. | 428/659 |

FOREIGN PATENT DOCUMENTS

| | | |
|---|---|---|
| DE | 8800254 | 3/1988 |
| DE | 19625548 | 1/1998 |
| DE | 10027444 | 2/2002 |
| DE | 10106890 | 9/2002 |
| JP | 61146366 | 7/1986 |
| WO | 9632202 | 10/1996 |

* cited by examiner

*Primary Examiner*—Lan Vinh
*Assistant Examiner*—Maki A Angadi
(74) *Attorney, Agent, or Firm*—Volpe and Koenig, P.C.

(57) ABSTRACT

Apparatus for paint or lacquer coating of a sheet capable of coiling that has precisely one drive, which is assigned in effect to a second coiling mount, wherein essentially no further means of influencing the running characteristics of the sheet are provided for.

23 Claims, 2 Drawing Sheets

APPARATUS AND PROCESS FOR PAINT OR LACQUER COATING OF A METAL SHEET CAPABLE OF COILING

BACKGROUND

The invention concerns an apparatus for paint or lacquer coating of a quasi-endless surface element, capable of coiling, and an appropriate process.

Quasi-endless coated metal sheets, in particular steel and aluminium sheets, are processed in huge numbers in the automobile industry and also for the manufacture of domestic appliances (so-called "white goods") and furthermore for the production of aircraft and water vessels and of construction panelling. Steel sheets are primarily metallically bare, galvanised or nickel-plated sheets with thickness values in the range between a few tenths of a millimeter and more than one millimeter. As pre-treatment for later painting or plastic coating, a corrosion protection coating and/or a primer coat is already applied to such sheets on the coil.

Such coatings are mostly applied in the liquid state, but occasionally also as powder coatings and, after application, must be rationally dried or cross-linked to arrive at a solid coating. To this end, and as is known, sheets are inductively heated to a temperature around or above 250° C., thus also heating up the coating to over 200° C., therefore drying or cross-linking it.

This process involves very large amounts of energy because it is not primarily the actual processed item, namely the applied coating, that is heated, but the sheet itself, which does not require any heating. By contrast, in certain cases heating of the sheet is even disadvantageous because it is capable of modifying specific physical properties of the sheet that have been adjusted in prior steps through conscientiously coordinated thermal processes, up to here. Incidentally, in view of the very large numbers of tons of coated sheet dried in this way, the energy lost as a result of unnecessary warming of the sheet adds up to considerable amounts in terms of the national economy.

A further considerable disadvantage of the known process consists of the high realization costs of inductive heating lines. In total, the aforementioned disadvantages lead to a price for sheets processed by the so-called "coil coating" method that is still relatively high today, which is manifesting itself increasingly disadvantageously in view of the increasing cost pressure on suppliers in the automobile and consumer goods industries.

The known coil coating processes supply high-quality products with a high throughput per unit of time. It has been found, however, that certain surface defects such as fine cracks and slight flaws can occur when recoiling the coated sheet with the hardened coating which, in certain circumstances, can severely impair usefulness during later use. During further processing, segments of strip with such flaws can results in products of impaired quality which, in certain circumstances, even has to be scrapped.

At an earlier time, the applicant had therefore proposed to realize the drying or cross-linking step in a so-called radiation drier by irradiating the coated surface of the surface element with electromagnetic radiation of a high power density in the range of near infrared, which has its essential active components in the wavelength range between 0.8 and 1.5 μm; cf. DE 101 06 890 A1. A similar process and suitable powder slurries have become known from DE 100 27 444 A1. In view of their considerable advantages, such coil coating processes using NIR® driers have in the meantime experienced widespread use in large industrial steel treatment.

One basic disadvantage of the known large industrial coil coating processes—with inductive or radiation drying—consists of the fact that process control and plant structure are tailored to large throughput volumes. Correspondingly powerful installations are space-consuming and costly and operate efficiently only if considerable use is made of their capacities. With these processes and plants, small orders at a customer's special request cannot be realized rationally because large volumes of scrap sheets are produced during the start-up phase and until constant process control is achieved and, in turn, when shutting down a plant. Due to the small batch size, that increases product costs, which are high anyway.

SUMMARY

The invention is therefore based on the object of providing an apparatus conforming to its genre and a process conforming to its genre with substantially improved suitability for small orders which, in particular, can also be used directly on the premises of the consumer of the coated sheets.

In relation to its apparatus aspect, this problem is solved by an apparatus according to the invention and, in relation to its process aspect, by a process according to the invention. Expedient enhancements of the invention's concept are described below and in the claims.

The invention is based on the fundamental idea of using a coil coating apparatus whose structure and operating principle are coordinated to the processing of small orders, in particular on site at the consumer's premises. Therefore, a compact, also portable in compliance with an essential aspect of the invention, plant is made available that manages without prolonged start-up or shutdown phases (in which no useful product is delivered).

With such a solution, even small volumes of surface elements in different colours and with different coating materials can be produced at low cost in a comparatively fast sequence of orders, with a low scrap rate and (also due to the relatively low creation costs of the proposed plants) also at low cost. Processing of orders in the order of magnitude of 20 m coil length is as realistic as the attainment of waste coil lengths (throughput up to stabilisation of the process parameters) of 5 m or less.

In accordance with a first independent aspect of the invention, the compact structure is promoted by the provision of precisely one drive on a coiling mount and the practically complete relinquishment of other means for influencing running properties (web tension regulator, etc.). Provided the system has a coiling mount at the output end, the drive is preferably assigned to it.

According to a further essential, relatively independent, aspect of the invention, the system is structured as a coherently crane-capable block on one common load-bearing construction. This guarantees fast and easy provision to the consumer of the coated sheets or other surface elements (lattices, networks, etc.).

The block preferably has outside dimensions that are maximally equal to those of a 30-foot to 50-foot standard container. This ensures a possibility of transport in appropriate standard containers "in one piece", by road or rail, and space-saving setting up at the place of use.

The compact structure is essentially enabled by virtue of the fact that the radiation drier has a large number of radiators whose essential active component lies in the range of near infrared or in the UV range and its dimension in the transport direction of the surface elements lies in any case under 5 m, preferably in the range between 500 and 2000 mm, in particular between 700 and 1500 mm. A further advantage (in combination with a suitable mode of operation) is a particularly compact design of a subsequently arranged cooling line, in particular realized as a powerful water cooling line.

The particularly compact structure of the radiation drier, in turn, is essentially achieved by virtue of the fact that the radiation drier has halogen filament lamps and/or UV medium or high-pressure lamps operated at a radiator temperature of 2900 K or more in an actively water or air-cooled integrated reflector housing. Here, it may be appropriate to suitably connect the water cooling of a solid metal reflector featuring internal cooling fluid channels with the water cooling in the subsequently arranged cooling line. In combination with this—or under certain operating conditions also as an alternative to this—cooling of the reflector and of the radiation sources (or particularly the ends of the lamps) with air is possible. Such an air supply can, in turn, also be designed so that is simultaneously serves to dissipate solvent components of the coating.

It is of particular advantage if (according to a further relatively independent aspect of the invention) the plant has precisely one media connection for operating energy and media, in particular precisely one main voltage connection and precisely one fresh water connection. Especially in the case of a crane-capable container design, the energy and media connections can be arranged on one container wall, in compliance with the spatial conditions at the intended operating location, but other configurations are naturally also possible. In this connection it is essential that a supply to the various consumption points within the apparatus takes place via one central distributor so that, if possible, only one connection needs to be produced at the operating location.

The proposed configuration is flexibly adaptable to differing conditions of use and additional or replacement components can be integrated easily in a modular fashion. Thus, for applications in which a fast change of the coating type or colour is required, a second coater can be provided or primer coating units or other pre-treatment units can be provided. Post-treatment units for the coated and dried sheet and/or different types of collecting units can be integrated at the output end.

The process according to the invention is distinguished by control of the coating and drying step that differs clearly from that of large engineering coil coating processes in terms of the time regime of starting up and stopping of passage of the surface elements: while the coating and drying step in conventional processes does not take effect until the sheet has essentially reached a predetermined nominal speed, in the process according to the invention this already takes place beforehand, in particular automatically when a predetermined fraction of the nominal speed has been reached.

A preferred process control is distinguished by virtue of the fact that a nominal speed in the range between 3 and 30 m/min, in particular between 5 and 20 m/min, is set. These transport speeds are substantially lower than in the case of industrial installations, but sufficient for the relatively low order volumes to which the solution according to the invention is tailored. The low speeds contribute towards enabling the different (and simplified) process and very low rates of scrapping uncoated or improperly coated sheet.

According to a preferred variant, paint or lacquer coating and drying are activated within 10 s, preferably within 5 s, after the process has been started. Again, it is advantageous that, in the proposed solution, paint or lacquer coating and drying are activated or deactivated simultaneously and/or no further essential control intervention in the paint or lacquer coating process and drying takes place between activation and deactivation. Whereas, in industrial installations, corresponding control commands are generally issued by qualified and experienced operating personnel, simplified control of the proposed process can also be realised by less-qualified operators, who may also be able to perform other tasks in parallel.

BRIEF DESCRIPTION OF THE DRAWINGS

Advantages and practicalities of the invention otherwise result from the dependent claims and the following description of two preferred variants with reference to the figures.

DETAILED DESCRIPTION OF THE PREFERRED EMBODIMENTS

Figure 1:
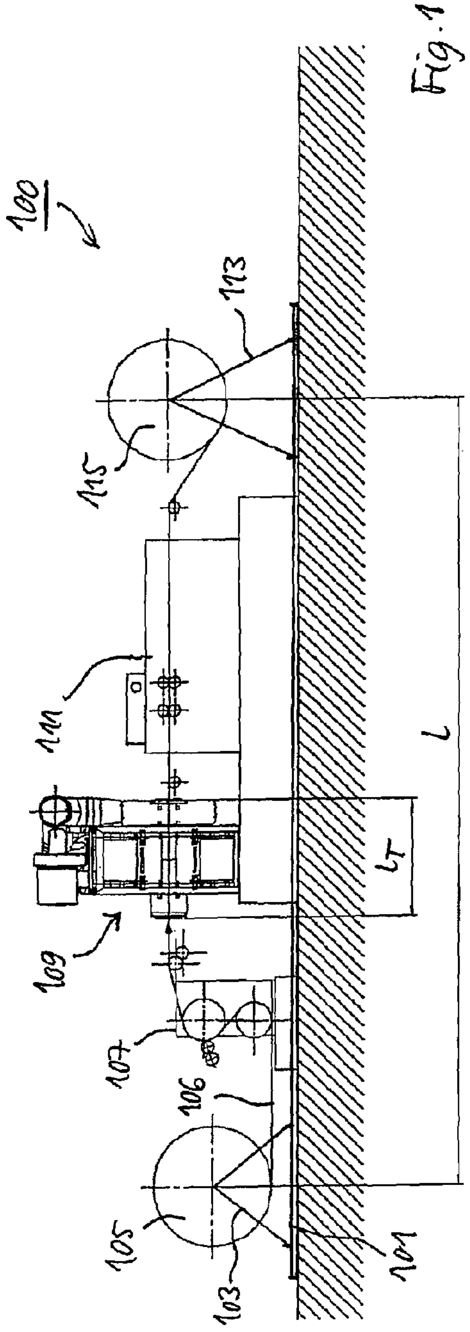
In FIGS. 1 and 2, these each show the equivalent sketch of an embodiment of the apparatus conforming to the invention in the form of a longitudinal section.

FIG. 1 shows a coil coating apparatus 100 that, on a joint carrier plate 101, has a first, input-end coiling mount 103 for an input-end coil 105 of a plate 106 to be coated, a roller coater 107, an NIR drier 109, a water cooling unit 111 and a second, output-end coiling mount 113 for output-end holding of a coil 115 of the coated sheet and a drive (not shown) assigned to the second coil mount 113 for transport of the sheet. In total, the apparatus is portable due to the fact that all components are mounted jointly on the carrier plate 101. With a dimension 1 of approximately 10 m between the axes of the first and second coiling mounts 103, 113—which is in particular enabled by a short drier length $1_T$ of the NIR drier 109—in total the apparatus can be transported completely assembled in a 40-foot standard container by road or rail to its place of use.

Figure 1A:
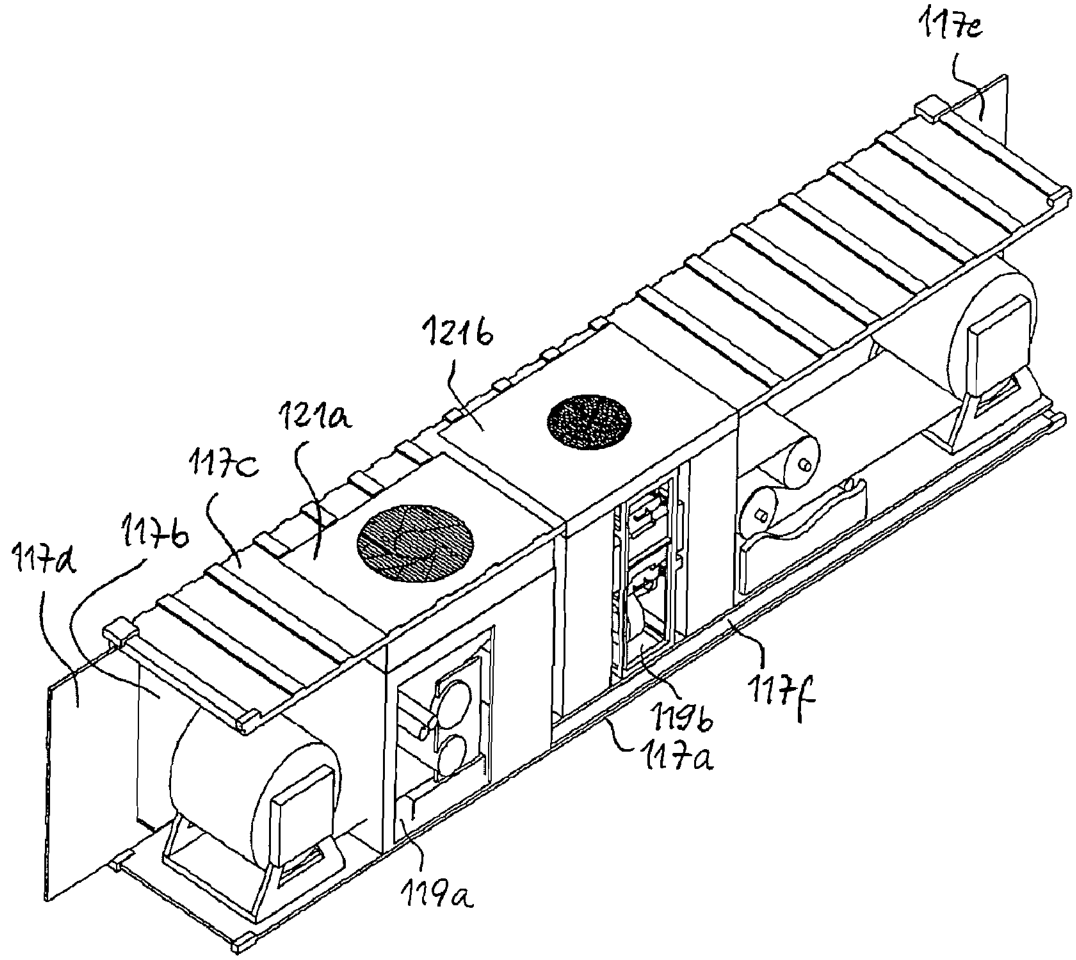

FIG. 1A schematically shows such a container variant of the apparatus 100, wherein the components of the apparatus mentioned further above are not designated here and are not explained yet again. The apparatus 100 is housed in a container 117, of which the floor 117*a*, the rear wall 117*b*, the top terminating wall (ceiling) 117*c* and a front and rear door 117*d*, 117*e* are shown in the figure. Over a part of the length, the floor or the mounting plate 117*a* is realized as a false floor 117*f* to accommodate media infrastructure.

On the side pointing towards the operator (in the figure of the front side), observation windows 119*a* or 119*b* are provided in the area of the coater 107 and of the NIR drier 109. Above the corresponding areas of the apparatus, ingoing and outgoing air treatment units 121*a*, 121*b* are provided which are linked to the atmosphere via ingoing and outgoing air openings (not separately marked). All infrastructure connections can be routed via a central connection unit that is attached outside the container, on its rear wall for example, and which is not recognisable in the figure. Incidentally, an electrical power supply and/or the gas supply for an assigned exhaust air treatment unit, as well as this unit itself, can be provided as additional dock-on units.

Figure 2:
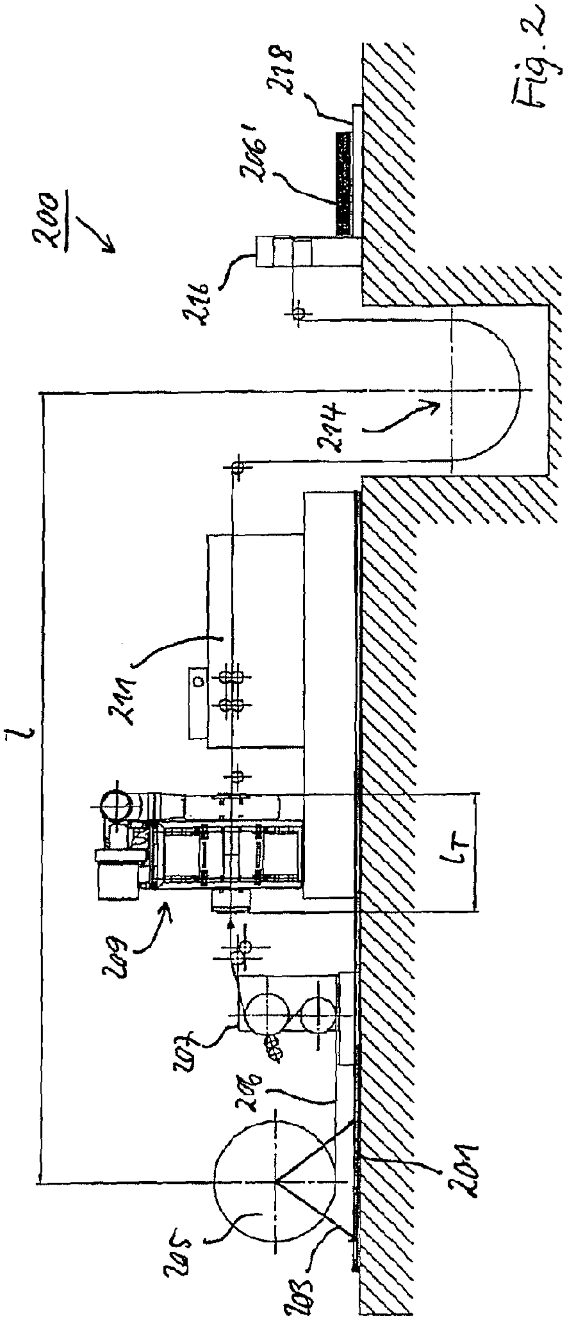

FIG. 2 shows a further compact coil coating system 200 that has a structure similar to the system 100 shown in FIG. 1. Coinciding parts are designated with reference numbers based on FIG. 1 and are not explained yet again here. The essential difference consists of the fact that, here, at the output end there is no (second) coiling mount, but a deflection unit 214 (merely shown symbolically) with subsequent sheet shears 216 and a stacking unit 218 to accommodate sheets cut to size 206'. These components are not arranged on the joint carrier plate 201, but are additionally assigned to the plant on the site. This makes it possible to accommodate the components arranged on the carrier plate 201 even in a 30-foot container, on the basis of the dimensions stated above.

Vertical expansion of the proposed apparatus is not only possible, as in the variant shown in FIG. 2, by including additional units recessed in the floor, but also by means of a two-tier version, which can be realised in practice by placing one container on top of another, each of which contains a part of the overall apparatus, for example in a first contain the input-end coiling mount, a first coater (for example for a primer) and a first drying line and in a second container a second coater (for example for a top coat), an assigned second drying line and an output-end coiling mount or cutting unit with panel deposit, etc.

Furthermore, it is possible, in a basic configuration of the apparatus, to deliberately provide for additional components to be possibly inserted later, for example an additional UV drier or a mechanical machining unit for the (uncoated or coated) coil.

It goes without saying that, within the scope of the invention, numerous variations of details of the realisation examples and processes aspects explained above are possible without moving out of the sphere of protection of the invention.

The invention claimed is:

1. Apparatus for paint or lacquer coating of a quasi-endless sheet element, capable of coiling, comprising:

a first coiling mount for rotatable input-end holding of a first coil of the sheet element, a coater located downstream of the first coiling mount for applying the paint or lacquer coating on the sheet element, a radiation drier located downstream of the coater for drying the coating as the sheet element passes through, the radiation drier emitting an essential effective radiation component that lies in a range of near infrared or in a UV range, a second coiling mount located downstream of the radiation drier for rotatable output-end holding of a second coil of the sheet element with the dried paint or lacquer coating, or a cutting and stacking unit for cutting and stacking the sheet element with the dried paint or lacquer coating, and a drive system for transporting the sheet element through the apparatus at a predetermined speed, the drive system consists essentially of precisely one drive assigned in terms of its effect to the first or second coiling mount, wherein essentially no further means of influencing running characteristics of the sheet element are provided.

2. Apparatus according to claim 1, wherein the radiation drier has a large number of radiators, and a dimension of the radiation drier in a transport direction of the sheet element lies in a range between 500 and 2000 mm.

3. Apparatus according to claim 2, wherein the radiation drier has emitters that emit radiation in the range of near infrared, the emitters comprise halogen filament lamps operated at a radiator temperature of 2900 K or more, and/or the emitters emit radiation in the UV range, and the emitters comprise UV medium or high-density lamps, located in an actively water or air-cooled integrated reflector housing.

4. Apparatus according to claim 1, further comprising precisely one media connection for operating energy and media, including precisely one main voltage connection and precisely one fresh water connection.

5. Apparatus according to claim 1, further comprising a two-tier structure, with a deflection unit for the coil for transport out of a first level to a second level and for reversal of the transport direction.

6. Apparatus according to claim 1, wherein the coater comprises two or more selectively operable coaters arranged one behind the other that can be operated selectively, and the radiation drier comprises a single radiation drier.

7. Apparatus according to claim 1, wherein the coater and the radiation drier comprise two or more coater/radiation drier combinations that are at least indirectly successive in the direction of transport.

8. Apparatus according to claim 7, wherein at least one of the radiation driers is equipped with emitters radiating in a range of near infrared and the other of the radiation driers is equipped with emitters radiating in a UV range.

9. Apparatus for paint or lacquer coating of a quasi-endless sheet metal element, capable of coiling, comprising:

a first coiling mount for rotatable input-end holding of a first coil of the sheet element, a coater located downstream of the first coiling mount for applying the paint or lacquer coating on the sheet element, a radiation drier located downstream of the coater for drying the coating as the sheet metal element passes through, the radiation drier emitting an essential effective radiation component that lies in a range of near infrared or in a UV range, a second coiling mount located downstream of the radiation drier for rotatable output-end holding of a second coil of the sheet metal element with the dried paint or lacquer coating, or a cutting and stacking unit for cutting and stacking the sheet element with the dried paint or lacquer coating, and at least one drive for transporting the sheet metal element through the apparatus at a predetermined speed, wherein at least the majority of the parts are provided as a coherent, crane-movement capable block on a common load-bearing construction.

10. Apparatus according to claim 9, wherein the block has outer dimensions that are at a maximum equal to outer dimensions of a 50-foot standard container.

11. Apparatus according to claim 9, wherein the radiation drier has a large number of radiators and a dimension of the radiation drier in the transport direction of the sheet metal element lies in a range between 500 and 2000 mM.

12. Apparatus according to claim 9, further comprising precisely one media connection for operating energy and media, including precisely one main voltage connection and precisely one fresh water connection.

13. Apparatus according to claim 9, further comprising a two-tier structure, with a deflection unit for the coil for transport out of a first level to a second level and for reversal of the transport direction.

14. Apparatus according to claim 9, wherein the coater comprises two or more selectively operable coaters arranged one behind the other that can be operated selectively and the radiation drier comprises a single radiation drier.

15. Process for paint or lacquer coating of a quasi-endless sheet element, capable of coiling, comprising reeling the sheet element off of a first coil and reeling the sheet element onto a second coil or feeding the sheet element to a cutting and stacking unit, providing a paint or lacquer coating during passage of the sheet element between the first coil and the second coil or cutting and stacking unit, activating a paint or lacquer coating and drying when the process is started, before a predetermined constant nominal speed of the sheet element is reached and/or deactivating paint or lacquer coating and drying when the process is stopped, after a drive has been deactivated and a speed of the sheet element has dropped below a nominal speed.

16. Process according to claim 15, further comprising activating the paint or lacquer coating and drying within 10 seconds after the process has been started.

17. Process according to claim 15, further comprising simultaneously activating or deactivating the paint or lacquer coating and drying.

18. Process according to claim 17, wherein no further essential control intervention in the paint or lacquer coating and drying takes place between activation and deactivation.

19. Process according to claim 15, further comprising automatically activating or deactivating the paint or lacquer coating and drying in response to detecting that an actual speed of the sheet element has reached a predetermined fraction of the nominal speed.

20. Process according to claim 15, wherein the nominal speed is set in the range between 3 and 30 m/min.

21. Process according to claim 15, further comprising selectively applying via separate coaters one of several optional coatings to the sheet element, and drying all of the optional coatings in a same drying range.

22. Process according to claim 15, further comprising applying at least two coatings in succession to the sheet elements and drying or hardening each of the coatings with drying parameters coordinated to characteristics of the coating material with a coordinated radiation wavelength.

23. Apparatus according to claim 22, wherein one of the coatings is dried or hardened with radiation in the range of near infrared and the other of the coatings is dried or hardened with radiation in a UV range.

* * * * *